(12) United States Patent
Mogren

(10) Patent No.: US 11,596,129 B2
(45) Date of Patent: Mar. 7, 2023

(54) METHODS OF MAKING AND USING A PET GROOMING AND SKIN CARE TOOL

(71) Applicant: Christopher C Mogren, Hugo, MN (US)

(72) Inventor: Christopher C Mogren, Hugo, MN (US)

( * ) Notice: Subject to any disclaimer, the term of this patent is extended or adjusted under 35 U.S.C. 154(b) by 0 days.

(21) Appl. No.: 17/930,568

(22) Filed: Sep. 8, 2022

(65) Prior Publication Data

US 2023/0000052 A1 Jan. 5, 2023

Related U.S. Application Data

(62) Division of application No. 16/840,570, filed on Apr. 6, 2020.

(60) Provisional application No. 62/860,314, filed on Jun. 12, 2019.

(51) Int. Cl.
| | | |
|---|---|---|
| A01K 13/00 | (2006.01) |
| A46B 13/02 | (2006.01) |
| A46B 9/00 | (2006.01) |
| A46B 13/00 | (2006.01) |

(52) U.S. Cl.
CPC .......... *A01K 13/001* (2013.01); *A01K 13/003* (2013.01); *A46B 9/005* (2013.01); *A46B 13/001* (2013.01); *A46B 13/02* (2013.01); *A46B 2200/1093* (2013.01)

(58) Field of Classification Search
CPC .............................. A46B 9/005; A45D 24/007
USPC ......................... 15/207.2; 119/601
See application file for complete search history.

(56) References Cited

U.S. PATENT DOCUMENTS

| | | |
|---|---|---|
| 663,697 A | 12/1900 | Gano |
| 2,111,238 A | 3/1938 | Doyle |
| 2,134,934 A | 11/1938 | Wilhoit |
| 2,303,089 A | 11/1945 | Peterson |
| 2,640,218 A | 6/1953 | Erling |
| 3,013,289 A | 12/1961 | Sasena |
| 3,142,080 A | 7/1964 | Nelson |
| 3,209,386 A | 10/1965 | Weber |
| 3,312,583 A | 4/1967 | Rochlis |
| 3,451,086 A | 6/1969 | Burgett |
| 3,890,984 A | 6/1975 | Lesetar |

(Continued)

FOREIGN PATENT DOCUMENTS

| | | |
|---|---|---|
| CN | 1622776 A | 6/2005 |
| CN | 102481226 A | 5/2012 |

(Continued)

OTHER PUBLICATIONS

Old Guy Diy, "Dill Scrub Brush," YouTube Video, Jan. 14, 2017, Published on YouTube, <https://www.youtube.com/watch?v=vWJ55u7IBtA>.

(Continued)

*Primary Examiner* — Peter M Poon
*Assistant Examiner* — Morgan T Jordan
(74) *Attorney, Agent, or Firm* — Sherrill Law Offices, PLLC

(57) ABSTRACT

Methods of making a pet grooming and skin care appliance and grooming an animal with the appliance by rotating the appliance with a hand held power drill. The appliance includes a drum secured to a rigid arbor. The drum defines an axis of rotation and has an array of flexible and resilient fingers of specific durometer extending radially outward from the axis of rotation. The arbor extends coaxially away from a proximal end of the drum.

17 Claims, 8 Drawing Sheets

(56) References Cited

U.S. PATENT DOCUMENTS

| | | |
|---|---|---|
| 3,909,868 A | 10/1975 | Nogues |
| 4,083,327 A | 4/1978 | Dowdy |
| 4,084,282 A | 4/1978 | Calvert |
| 4,197,608 A | 4/1980 | Holley et al. |
| 4,202,067 A | 5/1980 | Stamatovic |
| 4,302,122 A | 11/1981 | Moya |
| 4,944,319 A | 7/1990 | Trombley |
| 5,207,183 A | 5/1993 | Praschnik et al. |
| 5,224,231 A | 7/1993 | Nacar |
| 5,353,461 A | 10/1994 | Enriquez |
| 5,423,102 A | 6/1995 | Madison |
| 5,488,981 A | 2/1996 | Burkhart |
| 5,781,955 A | 7/1998 | Hendricks |
| 5,924,202 A | 7/1999 | Romani |
| 6,021,542 A | 2/2000 | Norman |
| 6,067,724 A | 5/2000 | Depoyian |
| 6,098,635 A | 8/2000 | Marino |
| 6,158,073 A | 12/2000 | Jiovanni |
| 6,170,107 B1 | 1/2001 | George et al. |
| 6,295,681 B1 | 10/2001 | Dolah |
| 7,114,211 B2 | 10/2006 | Elster |
| 7,246,573 B2 | 7/2007 | Dunn et al. |
| 7,260,862 B1 | 8/2007 | DeFilippis |
| 7,310,849 B2 | 12/2007 | White et al. |
| 7,356,867 B1 | 4/2008 | Beiermann |
| 7,743,683 B2 | 6/2010 | Dayton et al. |
| 7,814,602 B2 | 10/2010 | Stydahar |
| 3,006,648 A1 | 8/2011 | Sourwine |
| 8,060,967 B1 | 11/2011 | Johnson, Jr. |
| 8,132,541 B1 | 3/2012 | Baer, Jr. |
| 8,256,056 B2 | 9/2012 | Jones |
| 8,479,354 B1 | 7/2013 | Doyle |
| 8,752,227 B2 | 6/2014 | Manning |
| 8,881,684 B1 | 11/2014 | Yazdanpanah |
| 9,351,559 B2 | 5/2016 | Pardo et al. |
| 9,414,661 B2 | 8/2016 | Keong |
| 9,456,682 B2 | 10/2016 | Taylor |
| 10,314,388 B2 | 6/2019 | Rivera |
| 10,624,447 B1 | 4/2020 | Manning |
| 2001/0053305 A1 | 12/2001 | Berke et al. |
| 2003/0131865 A1 | 7/2003 | Richmond et al. |
| 2003/0192564 A1 | 10/2003 | Johnson |
| 2004/0074025 A1 | 4/2004 | Blaustein et al. |
| 2005/0000052 A1 | 1/2005 | Byles |
| 2005/0063764 A1 | 3/2005 | McKay |
| 2005/0066464 A1 | 3/2005 | McKay |
| 2005/0184099 A1 | 8/2005 | McKay |
| 2006/0026783 A1 | 2/2006 | McKay |
| 2006/0058714 A1 | 3/2006 | Rhoades |
| 2006/0248666 A1 | 11/2006 | Lies |
| 2006/0282978 A1 | 12/2006 | Kertz |
| 2007/0169720 A1 | 7/2007 | Roy |
| 2007/0209671 A1 | 9/2007 | Hase et al. |
| 2008/0092311 A1 | 4/2008 | Munn et al. |
| 2008/0104780 A1 | 5/2008 | Dayton et al. |
| 2008/0155769 A1 | 7/2008 | Schonewille et al. |
| 2008/0173138 A1 | 7/2008 | Dayton et al. |
| 2008/0244843 A1 | 10/2008 | Hui et al. |
| 2009/0255071 A1 | 10/2009 | Jones |
| 2011/0180013 A1 | 7/2011 | Kissel, Jr. |
| 2012/0174937 A1 | 7/2012 | Ragosta et al. |
| 2012/0291717 A1 | 11/2012 | Rifkin et al. |
| 2013/0145992 A1 | 6/2013 | Liang et al. |
| 2013/0248010 A1 | 9/2013 | Reiman |
| 2014/0289978 A1 | 10/2014 | Serra-Garrido |
| 2016/0165842 A1 | 6/2016 | De Koning-Trum et al. |
| 2017/0099806 A1 | 4/2017 | Kramer |
| 2018/0153297 A1 | 6/2018 | Rivera |
| 2019/0297790 A1 | 10/2019 | Hsia et al. |

FOREIGN PATENT DOCUMENTS

| | | |
|---|---|---|
| DE | 202005011730 U1 | 11/2005 |
| DE | 102004028609 A1 | 1/2006 |
| DE | 102013011441 A1 | 1/2015 |
| FR | 2482433 A1 | 11/1981 |
| GB | 306713 A | 2/1928 |
| GB | 2461291 A | 12/2009 |
| JP | 3211862 U | 8/2017 |
| KR | 101379506 B1 | 4/2014 |
| KR | 20150003628 U | 10/2015 |
| WO | 9847443 A1 | 10/1998 |

OTHER PUBLICATIONS

Practically Functional, "How To Make A Scrub Brush For Your Drill," YouTube Video, Apr. 2, 2017, Published on YouTube, <https://www.youtube.com/watch?v=o1n5r4CSKIk>.

Grommet, "Drill Brush | Drill Scrub Brush Set," YouTube Video, May 29, 2018, Published on YouTube, <https://www.youtube.com/watch?v=tAgmrFqSj2o>.

METHODS OF MAKING AND USING A PET GROOMING AND SKIN CARE TOOL

BACKGROUND

Numerous pet grooming and conditioning tools have been developed over the ages for facilitating care and cleaning of the pet's fur, coat, hair and skin. Each suffers one or more weaknesses including specifically but not exclusively the need for significant training, time and labor intensive, limited to use with only one of wet or dry conditions, effective only with select pet species, expense, etc. A substantial need exists for a pet grooming and conditioning appliance capable of facilitating care and cleaning of a pet's fur, coat, hair and skin that does not suffer these weaknesses.

SUMMARY OF THE INVENTION

The present invention is an animal grooming and conditioning of fur, coat, hair, and skin system that support a person in the general care and cleaning of various types of animals. The grooming and conditioning system is driven in a rotating manner by a power source such as a drill or other such device that rotates the drum. Attached to the drum are columns of flexible material that when placed against an animal's fur or coat aids in the removal of excess fur, hair, dirt & debris, and dead skin & dander. The flexible columns are not unlike teeth in a comb or brush in that they extend upward from a matting material that holds them in an upright fashion. Unlike a comb or brush, these flexible columns are wider in diameter, or variable height or width or number attached to the matting material. The flexible columns can also have variable levels of flexibility to alter the degree to which an animal's fur is conditioned.

The pet grooming and skin care appliance is adapted for use in combination with a hand held power tool. The appliance includes a drum secured to a rigid arbor. The drum defines an axis of rotation and has an array of flexible and resilient fingers that extend radially outward from the axis of rotation. The arbor extends coaxially away from a proximal end of the drum. The arbor is configured and arranged for operable engagement to a power tool for rotation of the arbor and the drum about the axis of rotation by a powered drive shaft on the power tool.

The pet grooming and skin care appliance can be manufactured by (i) obtaining an attachment configured and arranged for rotational engagement with a chuck on a power drill, the attachment comprising an arbor with a cylinder mounted to a distal axial end of the arbor, wherein the cylinder has a cylindrical sidewall and defines an axis of rotation, (ii) obtaining a flexible and resilient integrally molded element comprising a sheet having first and second ends, first and second side edges, and first and second major surfaces with an array of fingers projecting from the second major surface of the sheet, and (iii) securing the element to the sidewall of the cylinder with the first major surface facing the cylinder and the fingers projecting radially outward from the axis of rotation defined by the cylinder.

The pet grooming and skin care appliance can be used by (i) securing the arbor to a power tool for powered rotation of the appliance about the axis of rotation by the power tool, (ii) activating the power tool so as to effect rotation of the appliance about the axis of rotation by the power tool whereby the fingers on the appliance spin, and (iii) grooming a pet by stroking the coat of the pet with the spinning fingers.

The pet grooming and skin care appliance can include the following nonexclusive features.

Feature 1: Variable Flexible Column Sizes. The appliance can include flexible columns, not unlike teeth in a comb or large brush. These columns extend vertically from a matting material so they protrude upward. The columns are made out of flexible material such as rubber, soft, or flexible material that bend sideways when pressure is applied.

Feature 2: Variable Drum and Matting Material Sizes. The appliance can include flexible columns that are embedded in a matting material to form one solid piece. This matting material with flexible columns can be a variety of widths and lengths. Small animal grooming and conditioning systems will be an inch or so wide and a few inches long. Large animal grooming and conditioning systems can be six or more inches wide and over ten inches long.

Feature 3: Variable Attachment Options. The appliance can include attachment options to mount the rotating drum to a power source. The attachments can include cylinder or slightly squared metal attachment bars that connect to the front of a drill for example. Other attachment options may connect to the housing of the drill or other power source in a matter to provide better stability and control of fur, debris, or materials removed from the animals being conditioned.

Feature 4: Variable Animal Usage. The appliance can be used on a variety of animals such as cats, small, medium, and large dogs, horses, cows, and other such animals or livestock that has fur or hair that is commonly conditioned by washing, combing, or other such maintenance.

Feature 5: Power-Driven Drum Rotation. The appliance can be used with a power source such as a handheld, cordless, or power drill. This is the common power source but the driver to rotate the drum could be any number of small engines that are able to rotate the attachment bar.

Feature 6: One or Two Hand Systems. The appliance can be used with one or two-hand applications. The one hand application is most commonly used for smaller animals where the matting material and flexible columns is small enough to fit on a smaller power source such as a drill. With the larger animal grooming and conditioning systems for use on horses, cattle, or larger animals, the two-handed system provides more stability and support. The two-handed system can provide a handle extending from each side of the system with a power source rotating the drum in the center section between the handles.

Feature 7: Vacuum or Other Suction Adapters. The appliance can be used with a variety of adapters to aid in vacuuming up fur, hair, and other debris. This adapter has a special housing around the matting materials and flexible columns to create a fully enclosed system. The suction adapter then connects to a vacuum or other piece of equipment that provides flow of air away from the conditioning system.

Feature 8: Water or Other Cleaning Product Adapters. The appliance can be used with a variety of adapters to aid in the wetting, washing, and application of cleaners or other related products. The invention can be fitted with a hose not unlike a garden hose or other such pipe as to allow water to flow into the chamber containing the rotating drum. This flow of moisture when combined with a cleaning material will wash, condition, and remove fur, hair, or other debris in one easy application.

DETAILED DESCRIPTION OF A PREFERRED EMBODIMENT

Definitions

Figure 1:
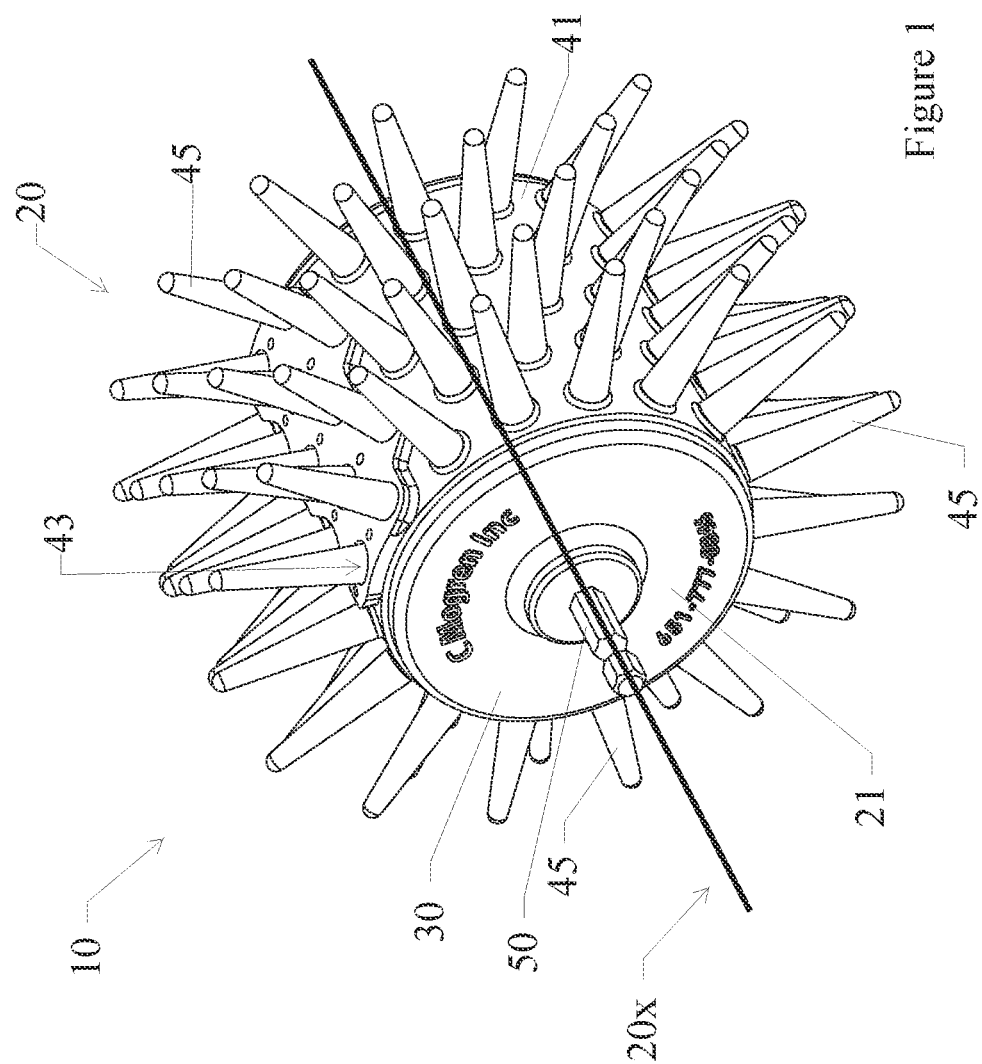
FIG. 1 is a proximal end perspective view of one embodiment of the invention.

As utilized herein, including the claims, the term "chuck" refers to any type of clamp used to secure an appliance to a power drill for powered rotation of the appliance, including specifically but not exclusively keyed chucks, keyless chucks and quick connect chucks.

As utilized herein, including the claims, the term "pet" refers to any domesticated animal kept for pleasure or show rather than utility and includes specifically but not exclusively companion animals such as dogs, cats and horses and show animals for display or performance such as horses, rabbits, goats, dairy cows, koalas, etc.

Nomenclature Table

| Ref. No. | Description |
|---|---|
| 10 | Appliance or System |
| 20 | Drum |
| 20x | Axis of Rotation |
| 21 | Proximal End of Drum |
| 30 | Core or Cylinder or Round Cup |
| 31 | Proximal End of Core |
| 32 | Sidewall of Core or Cylinder |
| 40 | Element |
| 41 | Base Sheet or Matting |
| $41a^1$ | First End of Base Sheet |
| $41a^2$ | Second End of Base Sheet |
| $41b^1$ | First Side Edge of Base Sheet |
| $41b^2$ | Second Side Edge of Base Sheet |
| $41c^1$ | First Major Surface, Inward Facing Portion or Inside Surface of Base Sheet |
| $41c^2$ | Second Major Surface of Base Sheet |
| 42c | Interlocking Sockets |
| 42d | Interlocking Knobs |
| 43 | Interlocking Orifices |
| 44 | Step-up Portion or Reciprocal Edge of Base Sheet |
| 45 | Fingers or Columns |
| 50 | Arbor or Attachment Bar |
| 80 | Enclosure or Casing for Drum |
| 81 | Band Clamp or Attachment Device on Enclosure |
| 88 | Peripheral Side Opening in Enclosure |
| 89 | Interior Volume of Enclosure |
| 90 | Conduit, Fluid Adapter or Suction Adapter |
| 91 | First End of Conduit |
| 92 | Second End of Conduit |
| 100 | Power Tool or Power Source |
| 110 | Chuck on Power Tool |
| 120 | Housing of Power Tool |
| 200 | Connection Tube |

Description

Construction

First Embodiment

Referring to FIGS. 1, 2, 6 and 8, the appliance 10 includes a drum 20 secured to a rigid arbor 50. The drum 20 defines an axis of rotation 20x and has an array of flexible and resilient fingers 45 that extend radially outward from the axis of rotation 20x. The arbor 50 extends coaxially away from a proximal end 21 of the drum 20. The arbor 50 is configured and arranged for operable engagement to a power tool 100 (e.g., engagement within a chuck 110 on the power tool 100) for rotation of the arbor appliance 10 about the axis of rotation 20x by a powered drive shaft (not shown) on the power tool 100.

The drum 20 can be cast as a single piece or constructed from the separate components of a robust core 30 and a flexible and resilient element 40.

Figure 3:
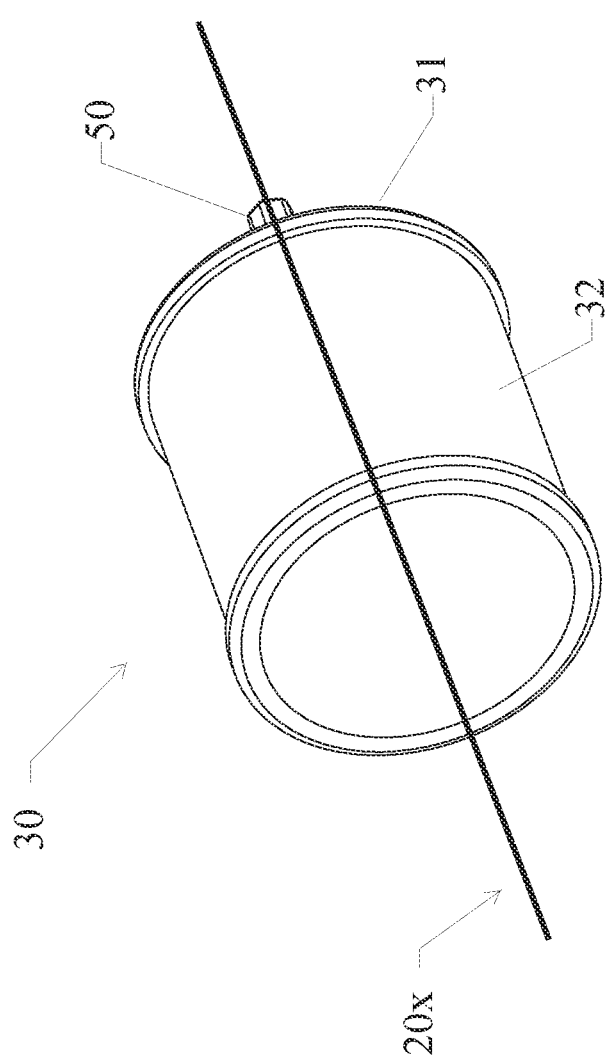
FIG. 3 is a distal end perspective view of the core component of the invention depicted in FIG. 2.

Referring to FIG. 3, the core 30 can be a rigid cylinder presenting an outward facing cylindrical sidewall 32. The arbor 50 is embedded within and extends axially from the center of the proximal end 31 of the core 30. The core 30 can be constructed from any material having sufficient structural integrity, including specifically but not exclusively wood, metal and plastic.

Figure 4:
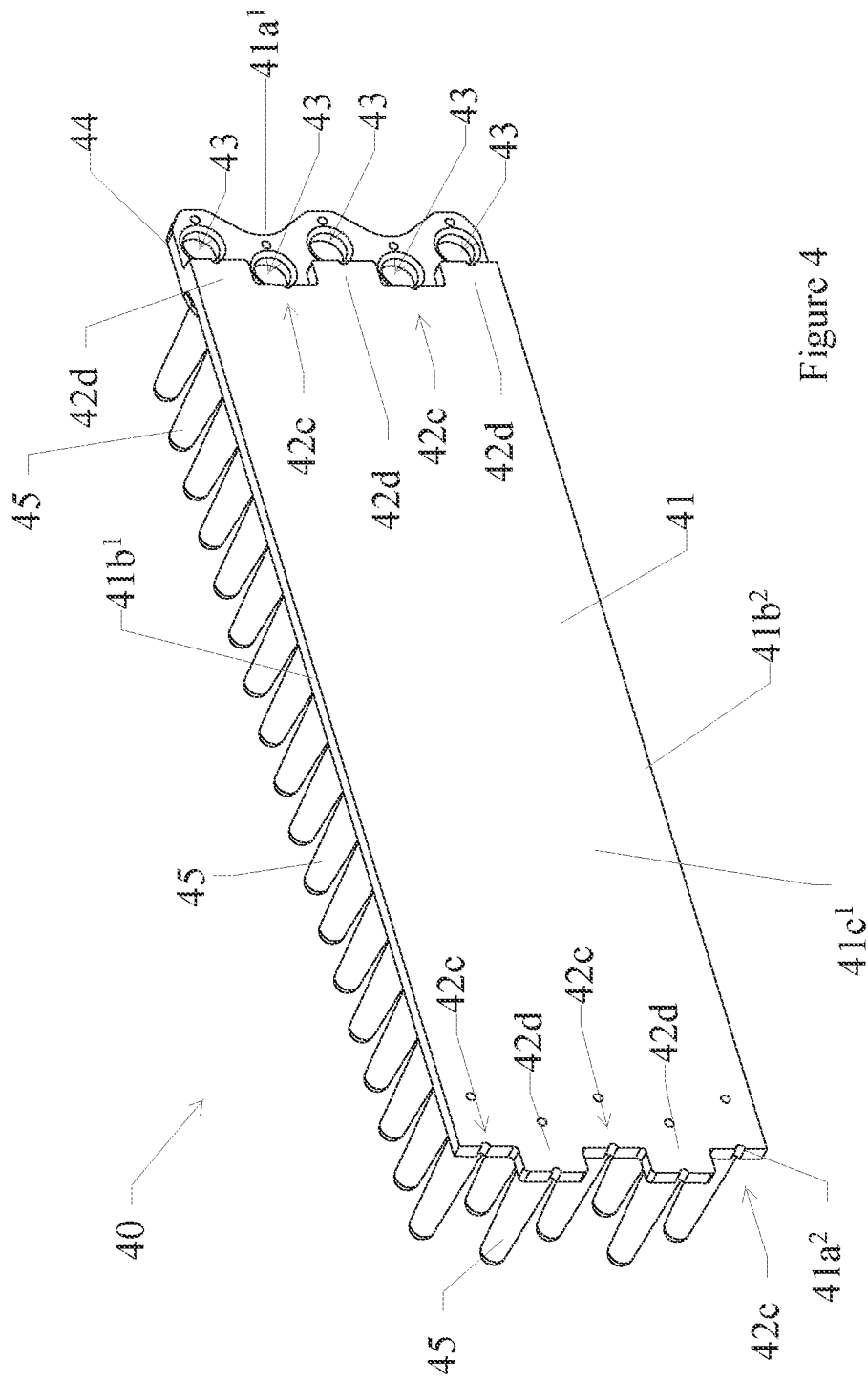
FIG. 4 is a bottom perspective view of the molded element component of the invention depicted in FIG. 1 prior to bending of the element into a cylinder and interlocking the abutting ends.
Figure 5:
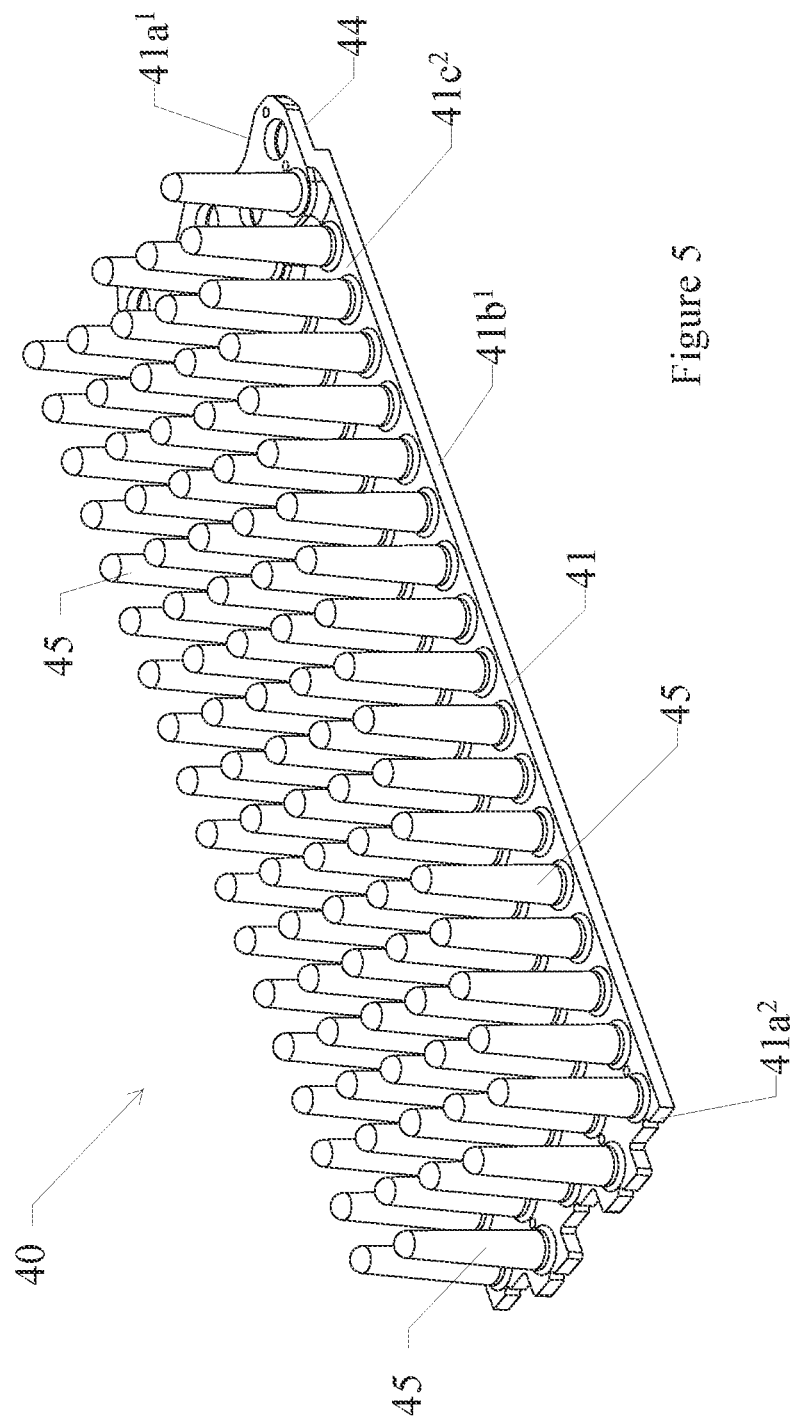
FIG. 5 is a top perspective view of the molded element component of the invention depicted in FIG. 1 prior to bending of the element into a cylinder and interlocking the abutting ends.

Referring to FIGS. 4 and 5, the flexible and resilient element 40 can be an integrally molded flexible component of a planar base sheet 41 with an array of fingers 45 projecting from a major surface of the base sheet 41. The base sheet 41 has first and second ends $41a^1$ and $41a^2$, first and second side edges $41b^1$ and $41b^2$, and first and second major surfaces $41c^1$ and $41c^2$ with the array of fingers 45 projecting from the second major surface $41c^2$ of the base sheet 41. The element 40 can be constructed from any material providing appropriate flexibility and resiliency, including specifically but not exclusively natural and synthetic rubbers.

Figure 2:
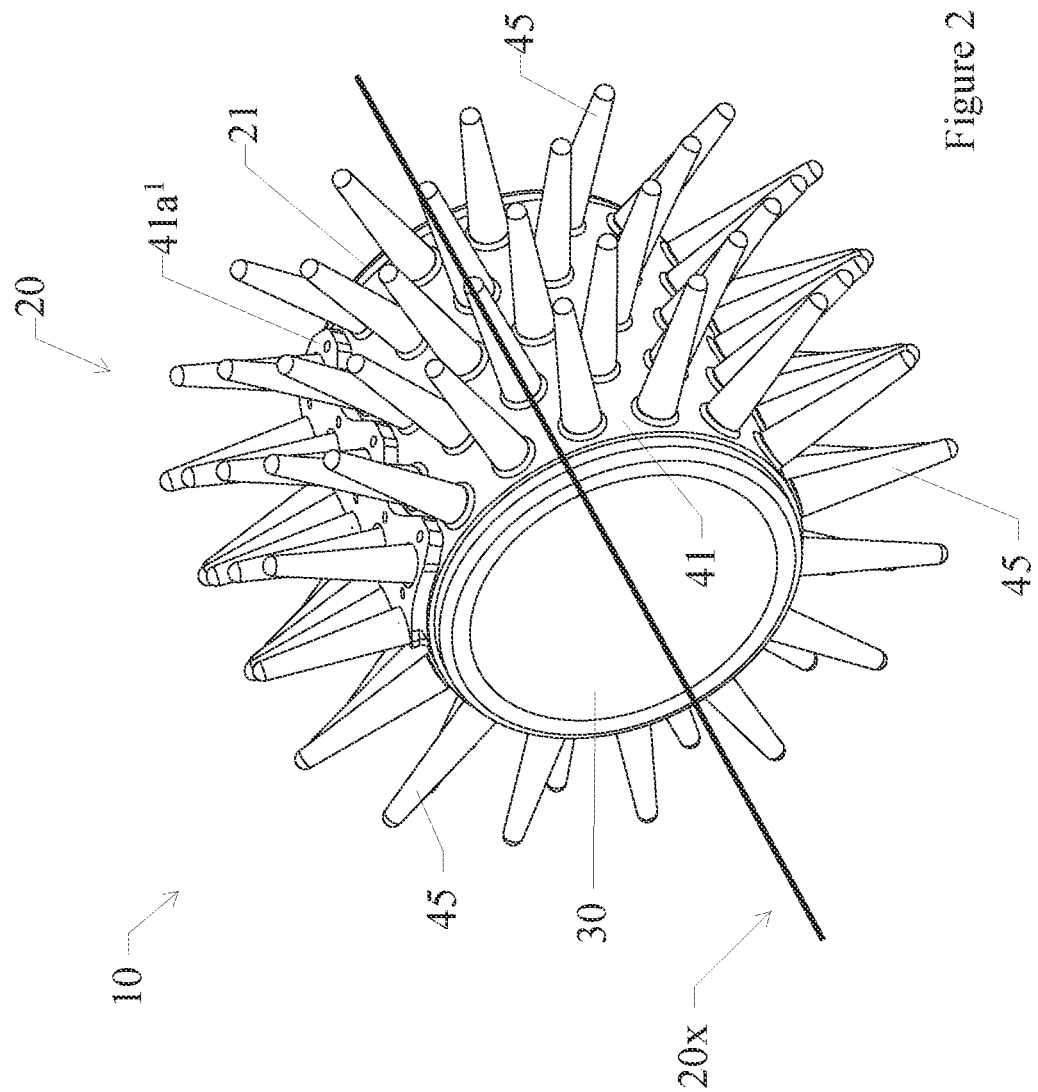
FIG. 2 is a distal end perspective view of the invention depicted in FIG. 1.

Referring to FIGS. 1, 2 and 5, the array of fingers 45 may be spaced as a uniform or random array with a preference for a uniform alternating array. The fingers 45 are preferably conical, tapering as they project away from the base sheet 41. The element 40 preferably has at least sixty fingers 45, with each finger 45 extending at least 2 cm and most preferably at least 4 cm from the base sheet 41 and having a shore A durometer of between 30 and 100.

Referring to FIG. 4, both ends $41a^1$ and $41a^2$ of the base sheet 41 can be configured with alternating interlocking sockets 42c and knobs 42d which interlock in a zipper-like fashion when the element 40 is bent into a cylindrical shape with the ends $41a^1$ and $41a^2$ brought into abutting engagement with one another. The interlocked sockets 42c and knobs 42d control left and right shifting of the ends $41a^1$ and $41a^2$ relative to one another.

Referring to FIGS. 1, 2, 4 and 5, an array of interlocking orifices 43 is provided in an overlap step-up portion 44 at the first end $41a^1$ of the of the base sheet 41. The spatial arrangement and diameter of the orifices 43 permits frictional engagement of a row or two of the fingers 45 at the second end $41a^2$ of the of the base sheet 41 into the orifices 43 for holding the element 40 in a cylindrical configuration when formed for mounting upon the sidewall 32 of the core 30.

Figure 7:
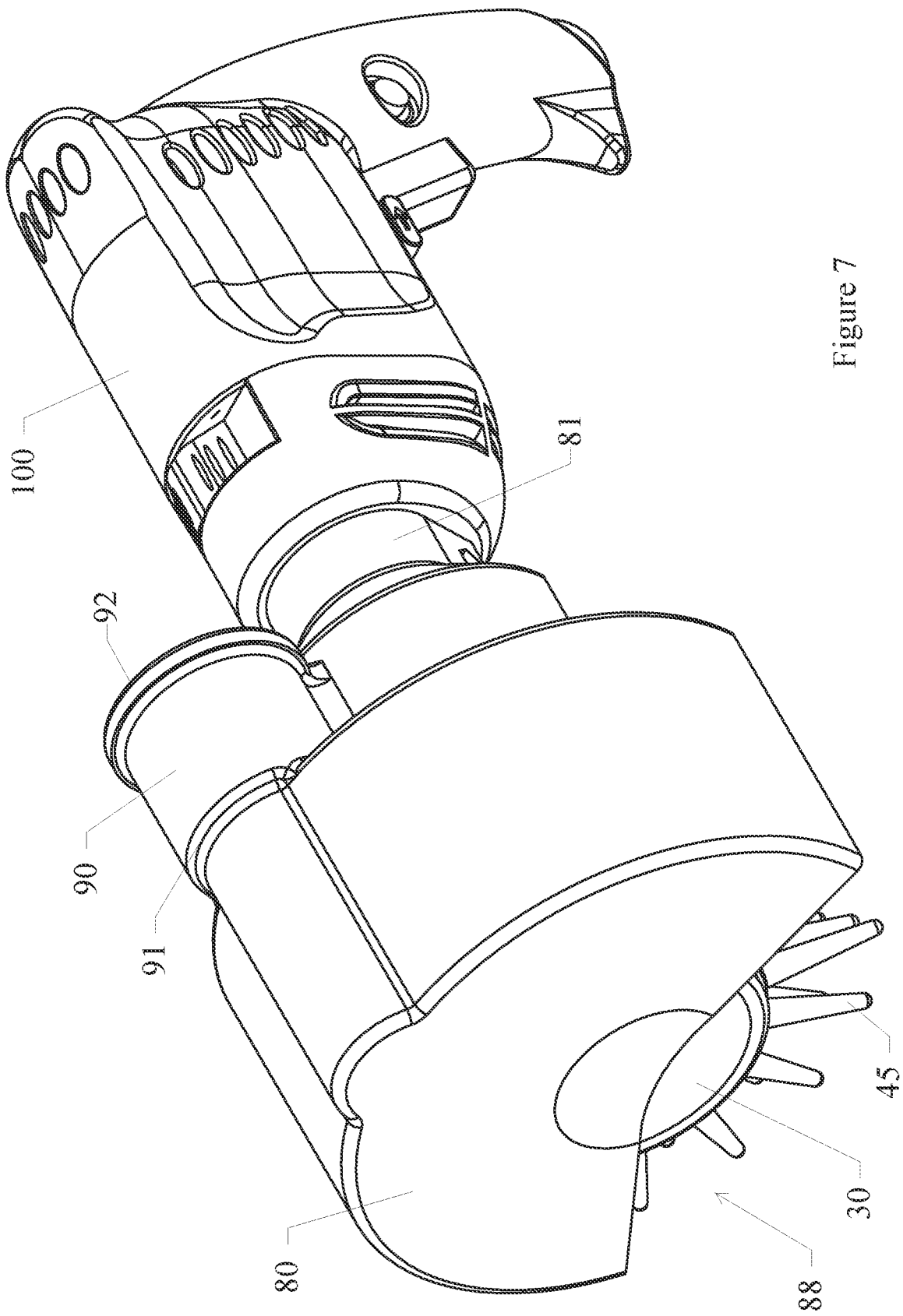
FIG. 7 is a front perspective view of the invention depicted in FIG. 1 including an embodiment of an enclosure, attached to a power drill.
Figure 8:
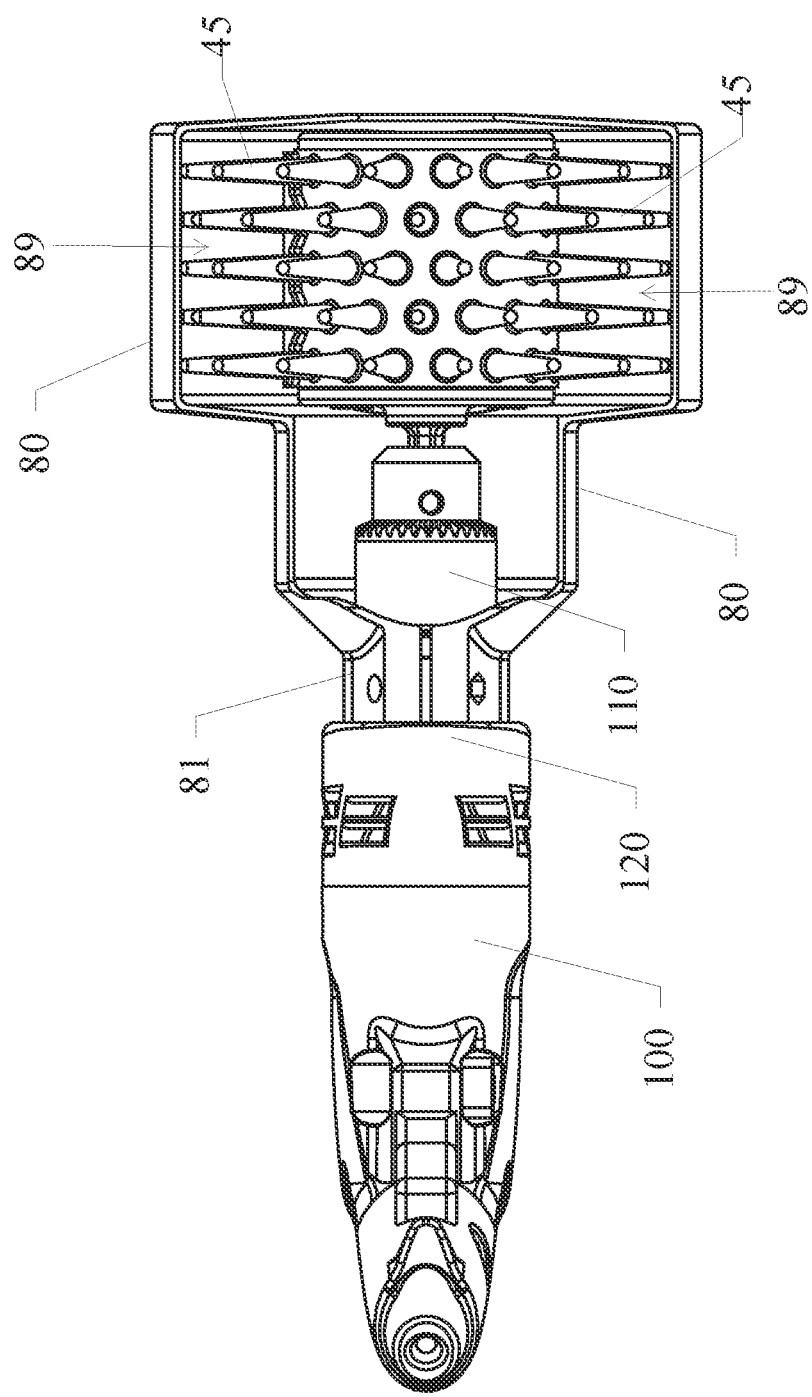
FIG. 8 is a bottom plan view of the invention depicted in FIG. 7.

Referring to FIGS. 7 and 8, an enclosure 80 may be provided for enclosing the drum 20 within an interior volume 89. A peripheral side opening 88 is provided in the enclosure 80 through which the fingers 45 extend for use. The enclosure 80 is preferably a cylindrical segment (i.e., a cylinder with a segment removed so as to create the peripheral side opening 88) wherein the volume of the cylindrical segment comprises between 50% to 67% of the volume of a complete cylinder from which the segment is formed.

The enclosure 80 includes a band clamp 81 for securing the enclosure 80 to the housing 120 of a power tool 100 while providing unimpeded passage of the chuck 110 on the power tool 100 into the interior volume 89.

A conduit 90 can be provided with a first end 91 in communication with the interior volume 89 and a second end 92 adapted for releasable fluid communication with a source of suction (not shown) via a common flexible connection tube 200 for vacuuming hair and dander removed by the appliance 10, or alternatively a source of pressurized liquid (not shown) via a common flexible connection tube 200 for wetting the pet's hair during use of the appliance 10. The liquid can be selected from various liquids useful for grooming or treating a pet including specifically but not exclusively water, and an aqueous solution containing at least one of a shampoo, a conditioner, and a topical medicament. The enclosure 80 can be constructed from any material having sufficient structural integrity, including specifically but not exclusively metal and plastic.

Second Embodiment

Referring generally to FIGS. 1, 2, 4 and 5, the matting material 41 is made of a malleable material with the flexible columns 45 extending outward and infused directly into the same, single piece of material 41. Although explained separately, the matting material 41 and flexible columns 45 are made of the same, single piece of material.

The flexible columns 45 can be of various heights, widths, and rigidity. The columns 45 can be bent in any direction by touching them or pressing against them when the matting material 41 is affixed to the rotating drum (core 30). They can also be square columns 45 with rounded ends or a more tapered shape with the tip furthers from the matting material 41 being narrower than the column 45 width closest to the matting material 41. The flexible columns 45 can be spaced or staged in various patterns or configurations as they relate to the matting material 41. Depending upon the application or usage, the flexible columns 45 can be aligned in a straight line row, wave-row, zig-zag, or random pattern. The density or number of flexible columns 45 placed on the matting material 41 is variable depending upon usage scenario.

The matting material 41 can be connected with a straight or interlocking edge that runs diagonally across the two ends $41a^1$ and $41a^2$ of the matting material 41 when it is laid out flat. The interlocking edge has a contour or zipper-like shape that allows the two ends $41a^1$ and $41a^2$ to fit exactly together. One side of the interlocking edge fits into the reciprocal edge while the other edge fits overtop. For a more precise fit of the interlocking edges, a few of the flexible columns 45 fit into and protrude the reciprocal edge.

The matting material 41 is created in a flat sheet-like piece. It is then rolled or rounded and the two ends $41a^1$ and $41a^2$ fit together so that the resultant cylinder shape can be affixed to drum or round cup 30 that is rotated. The matting material 41 is stretched around and fastened to the rotating drum (core 30). The matting material 41 can have a smooth inward facing portion $41c^1$ of the matting material 41. It is on this inside surface $41c^1$ of the matting material 41 that an adhesive, glue, tape, screw, or other such anchoring process enables the matting material 41 to be affixed to the rotating drum (core 30) and not slip, slide, or fall off during use.

Screws can be used in some applications by anchoring from the outside of the matting material 41 inward. The attachment screw can be driven from the outside of the matting material 41 and through the rotating drum (core 30). The screws are optional and would be flush to both outside and inside of the rotating drum (core 30). These can provide a greater level of connection of the matting material 41 to the rotating drum (core 30) if certain applications of the animal grooming and conditioner system 10 require it.

The matting material 41 and flexible columns 45 can be of any color.

Figure 6:
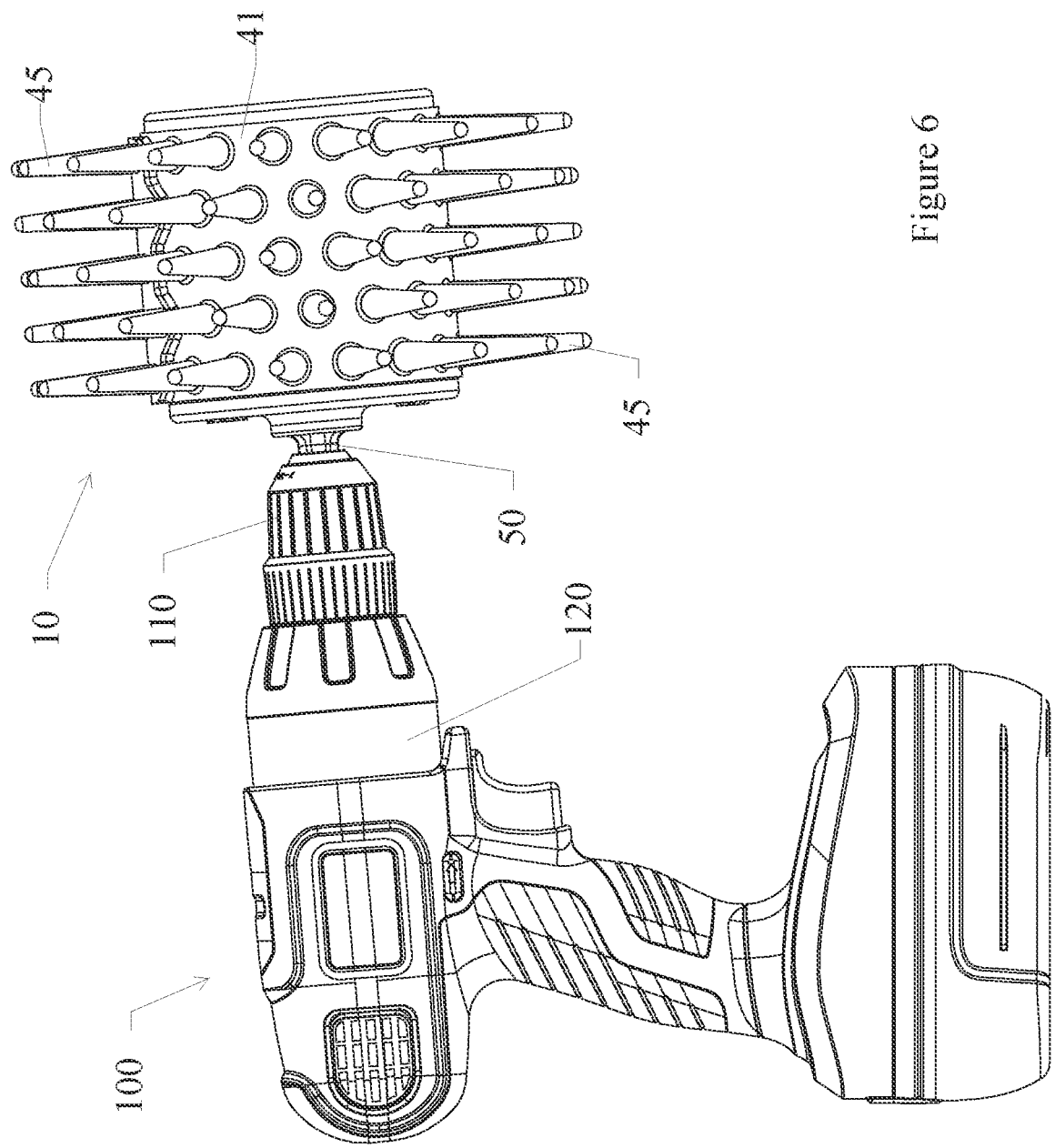
FIG. 6 is a side elevation view of the invention depicted in FIG. 1 rotationally attached to a power drill.

Referring to FIGS. 6-8, the rotating drum (core 30) is adhered to the matting material 41 and flexible columns 45 while also being attached to a power source 100 such as a cordless drill or some other such rotating device.

The rotating drum (core 30) can be open on one end with a flat edge. It is preferably light weight and made of a water proof material like plastic.

The attachment bar 50 extends from the center of the rotating drum (core 30). This attachment bar 50 can be of various lengths, shapes, and materials. The purpose of the bar 50 is to allow for quick attachment and removal to a power source 100 that drives the rotation while also minimizing any slippage of this attachment bar 50.

An attachment device such as a lock-nut or other such nut can be threaded onto the attachment bar 50 connected at the center of the rotating drum (core 30). These pieces act as the connection between the rotating drum (core 30) and the power source 100 driving the rotation of the matting material 41 and flexible columns 45.

Attachment adhesive can be applied to the inner surface $41c^1$ of the matting material 41 to reduce the possibility that the matting material 41 will slip, slide, or otherwise loose the connection between the rotating drum (core 30) and the matting material 41.

The power source 100 for the rotating drum 20 can be a cordless, power drill or some other small motor that will rotate the attachment bar 50 in a clock or counter clockwise matter so that the matting material 41 and flexible columns 45 are pushed through the fur or hair of the animal.

The matting 41, attachment bar 50, etc. can be enclosed in a casing 80 that aids in the collection of hair, fur, and other debris. This casing 80 is made of a light weight, water resistant material like plastic or something similar. The casing enclosure 80 covers about one half to two thirds of the rotating drum 20 so that a portion of the flexible columns 45 are exposed. The exposed flexible columns 45 come in contact with the animal's fur as the user of the system 10 rotates the drum 20 with the power source 100 and moves the flexible columns 45 across the animal.

An attachment device 81 for the casing 80 wraps around a front portion of the housing 120 of a cordless or corded power drill 100. The attachment device 81 can have a screw and nut that enables a tight grip of the casing enclosure 80 to the power source 100 driving the drum 20 rotation.

A debris removal hose for suction adapter 90 can provide an alternate path for the debris to be removed from the matting material 41 and flexible columns 45 as the drum 20 rotates. A source of air suction can be attached to the casing enclosure 80 via the suction adapter 90. As the drum 20 rotates in a clock or counter clockwise manner and suction is applied, the grooming system 10 can contain these materials like hair, fur, and other debris and pull them into a collection device like a vacuum cleaner.

The debris removal hose for suction adapter 90 can be a universal connection piece so the animal grooming and conditioning system can be affixed to a variety of suction sources such as vacuum cleaner hoses or other devices with a hose. The adapter 90 can be affixed to a common vacuum or other suction device. Connection of a flexible hose to the adapter 90 allows for variable distance from the suction device and the animal grooming and conditioning system 10 for more efficient scenarios of use. The adapter 90 is configured and arranged to provide air flow from the bottom, or portion of the animal grooming and conditioning system 10 that is in contact with the animal's fur, to the top of the system 10 where the adapter 90 connects.

A two handled grooming and conditioning system 10 can be used for larger animals, such as horses or cows, which require a larger matting material 41 and flexible columns 45. This version of the system 10 can have a handle extending out from the rotating drum 20 on both the right and left side of the system 10. There can be a throttle, trigger, or other such device to manage the speed that the drum 20 will rotate affixed to one of the handles. Generally, the width and length of the matting material 41 used with a two handled grooming and conditioning system 10 will be wider and longer in order to cover a larger rotating drum (core 30). The power source 100 for the two handled system 10 can be contained within the rotating drum (core 30) or affixed to a casing 80 that will cover up to one half of the rotating drum 20.

A water or cleaning material adapter 80 can be affixed to the casing 80 around the matting material 41 and flexible columns 45. The water source can be a tap or other water source with a simple threaded end connector. The water can be forced through the casing 80 and applied to the flexible columns 45 as they are rotated by the power source 100.

The system 10 provides the advantages of (i) variable widths and lengths of matting material 41 and flexible columns 45, (ii) variable strength of flex to the matting material 41 and flexible columns 45, (iii) variable scenarios of use from small to large animals, (iv) variable number of handles (single or double handle), (v) variable dry or wet usage scenarios, (vi) variable number of adapters (vacuum, water, cleaner, etc.), (vii) variable options for power sources 100 to drive rotating drum 20, and (viii) variable speed of rotating drum 20 offers greater cleaning or massaging functions.

In broad embodiment, the system 10 power brushes animals and/or other livestock for the purpose of grooming and conditioning the fur, coat, hair, and skin. It supports a person in the general care and cleaning of various types of animals by removing fur, hair, or other debris while also spreading the natural oils in many animals' fur throughout their coats. The grooming and conditioning system 10 is driven in a rotating manner by a power source 100 such as a drill or other such device that spins the drum 20 with additional attachments to capture the fur or other debris, distribute water onto the animal, or insert other cleaning agents onto the matting material 41 and flexible columns 45 for enhanced cleaning.

Method of Making

The drum 20 is preferably assembled from the separately manufactured components of rigid core 30 and molded flexible and resilient cylindrical element 40 with press fitting of the core 30 into the hollow center of the cylindrical element 40 with the interior major surface of the cylindrical element 40 engaging the exterior sidewall 32 of core 30. The element 40 may be compression fit, mechanically secured and/or adhesively secured to the exterior sidewall 32 of core 30.

The element 40 may be molded as a hollow cylinder, but the complex three dimensional nature of such a cylindrical element 40 with a plurality of outward radially extending fingers 45 renders this rather difficult. It is generally preferred to cast the element 40 with a planar base sheet 41 having the array of fingers 45 projecting upward in the same orthogonal direction from the base sheet 41. When cast as a planar element 40, the element 40 can be formed into a cylinder by bringing the ends $41a^1$ and $41a^2$ of the base sheet 41 together, inserting the fingers 45 at the second end $41a^2$ of the base sheet 41 into the corresponding interlocking orifices 43 through the first end $41a^1$ of the base sheet 41, and forcing the ends $41a^1$ and $41a^2$ of the base sheet 41 together into overlapping contact whereby the fingers 45 are interference fit within the orifices 43 and the sockets 42c and knobs 42d on both ends $41a^1$ and $41a^2$ of the base sheet 41 interlock together in a zipper pattern underneath the overlapping step-up portion 44 of the base sheet 41.

Method of Using

The appliance 10 may be used by (i) securing the arbor 50 to a power tool 100 for powered rotation of the appliance 10 about the axis of rotation 20x by the power tool 100 (ii) activating the power tool 100 so as to effect rotation of the appliance 10 about the axis of rotation 20x by the power tool 100 whereby the fingers 45 on the appliance 10 spin, and (iii) grooming a pet by stroking the coat of the pet with the spinning fingers 45. Referring to FIGS. 6 and 8, the arbor 50 can generally be secured to the power tool 100 by securing the arbor 50 within a chuck 110 on the power tool 100.

When the appliance 10 is equipped with an enclosure 80, use of the appliance 10 includes the additional steps of (iv) securing the enclosure 80 to the housing 120 of the power tool 100 with the chuck 110 on the power tool 100 projecting into the interior volume 89 defined by the enclosure 80 and either (v) placing a source of suction (not shown) in fluid communication with the second end 92 of the conduit 90 on the enclosure 80 and activating the source of suction to apply suction to the interior volume 89 defined by the enclosure 80, or alternatively placing a source of pressurized liquid (not shown) in fluid communication with the second end 92 of the conduit 90 on the enclosure 80 and releasing the pressurized liquid into the interior volume 89 defined by the enclosure 80.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiment and methods within the scope and spirit of the invention.

I claim:

1. A method of making a pet grooming and skin care appliance for use in combination with a hand held power tool, comprising the steps of:
   (a) obtaining an attachment configured and arranged for rotational engagement with a chuck on a power drill, the attachment comprising an arbor with a cylinder mounted to a distal axial end of the arbor, wherein the cylinder has a cylindrical sidewall and defines an axis of rotation, (b) obtaining a flexible and resilient integrally molded element comprising a sheet having first and second ends, first and second side edges, and first and second major surfaces, with an array of fingers having a shore A durometer of between 30 and 100, and (c) securing the element to the sidewall of the cylinder with the first major surface facing the cylinder and the fingers projecting radially outward from the axis of rotation defined by the cylinder.

2. The method of claim 1 further comprising the step of interlocking the first and second ends of the sheet together to shape the element into a cylinder with the fingers projecting radially outward.

3. The method of claim 1 wherein the element is secured to the cylinder by interference fit.

4. The method of claim 1 wherein the element is adhesively secured to the cylinder.

5. The method of claim 1 wherein the element is mechanically secured to the cylinder.

6. The method of claim 1 wherein the element includes at least sixty fingers having a length of at least 4 cm.

7. A method of grooming a pet, comprising the steps of:
(a) obtaining a power tool having a powered drive shaft,
(b) obtaining a pet grooming and skin care appliance, including at least:
  (i) a drum defining an axis of rotation and having an array of flexible and resilient fingers having a shore A durometer of between 30 and 100, and extending radially outward from the axis of rotation, and
  (ii) a rigid arbor extending coaxially away from a proximal end of the drum, the arbor configured and arranged for operable engagement to the power tool for rotation of the arbor and the drum about the axis of rotation by the powered drive shaft on the power tool,
(c) securing the arbor to the power tool for powered rotation of the appliance about the axis of rotation by the power tool,
(d) activating the power tool so as to effect rotation of the appliance about the axis of rotation by the power tool whereby the fingers on the appliance spin about the axis of rotation, and
(e) grooming a pet by stroking the coat of the pet with the spinning fingers.

8. The method of claim 7 wherein the arbor is secured to the power tool by securing the arbor within a chuck on the power tool.

9. The method of claim 7 wherein the appliance includes at least sixty fingers having a length of at least 4 cm.

10. A method of grooming a pet, comprising the steps of:
(a) obtaining a power tool having at least:
  (i) a powered drive shaft, and
  (ii) a housing surrounding the powered drive shaft,
(b) obtaining a pet grooming and skin care appliance, including at least:
  (i) a drum defining an axis of rotation and having an array of flexible and resilient fingers, each having a shore A durometer of between 30 and 100, and extending radially outward from the axis of rotation,
  (ii) a rigid arbor extending coaxially away from a proximal end of the drum, the arbor configured and arranged for operable engagement to the power tool for rotation of the arbor and the drum about the axis of rotation by the powered drive shaft on the power tool,
  (iii) an enclosure surrounding the drum within an interior volume of the enclosure, with a peripheral side opening through the enclosure for operably exposing fingers of the drum rotated into the peripheral side opening for contact with a pet, and
  (iv) a conduit having a first end in fluid communication with the interior volume defined by the enclosure and a second end adapted for releasable fluid communication connection with a source of suction,
(c) securing the arbor to the power tool for powered rotation of the appliance about the axis of rotation by the power tool,
(d) securing the enclosure to the housing of the power tool,
(e) placing a source of suction in fluid communication with the second end of the conduit,
(f) activating the power tool so as to effect rotation of the appliance about the axis of rotation by the power tool whereby the fingers on the appliance spin,
(g) activating the source of suction to apply suction to the interior volume defined by the enclosure, and
(h) grooming a pet by stroking the coat of the pet with the spinning fingers.

11. The method of claim 10 wherein the arbor is secured to the power tool by securing the arbor within a chuck on the power tool.

12. The method of claim 10 wherein the appliance includes at least sixty fingers having a length of at least 4 cm.

13. A method of grooming a pet, comprising the steps of:
(a) obtaining a power tool having at least:
  (i) a powered drive shaft, and
  (ii) a housing surrounding the powered drive shaft,
(b) obtaining a pet grooming and skin care appliance, including at least:
  (i) a drum defining an axis of rotation and having an array of at least sixty flexible and resilient fingers, each having a shore A durometer of between 30 and 100 and extending radially outward from the axis of rotation,
  (ii) a rigid arbor extending coaxially away from a proximal end of the drum, the arbor configured and arranged for operable engagement to the power tool for rotation of the arbor and the drum about the axis of rotation by the powered drive shaft on the power tool,
  (iii) an enclosure surrounding the drum within an interior volume of the enclosure, with a peripheral side opening through the enclosure for operably exposing fingers of the drum rotated into the peripheral side opening for contact with a pet, and
  (iv) a conduit having a first end in fluid communication with the interior volume defined by the enclosure and a second end adapted for releasable fluid communication connection with a source of pressurized fluid,
(c) securing the arbor to the power tool for powered rotation of the appliance about the axis of rotation by the power tool,
(d) securing the enclosure to the housing of the power tool,
(e) placing a source of a pressurized liquid in fluid communication with the second end of the conduit,
(f) activating the power tool so as to effect rotation of the appliance about the axis of rotation by the power tool whereby the fingers on the appliance spin,
(g) activating the source of a pressurized liquid to deliver the liquid into the interior volume defined by the enclosure, and
(h) grooming a pet by stroking the coat of the pet, wetted by the liquid, with the spinning fingers.

14. The method of claim 13 wherein the arbor is secured to the power tool by securing the arbor within a chuck on the power tool.

15. The method of claim 13 wherein the liquid is water.

16. The method of claim 13 wherein the liquid is an aqueous solution containing at least one of a shampoo, a conditioner, and a topical medicament.

17. The method of claim 13 wherein the appliance includes at least sixty fingers having a length of at least 4 cm.

\* \* \* \* \*